(12) United States Patent
Hoppe (10) Patent No.: US 11,998,021 B2
(45) Date of Patent: Jun. 4, 2024

(54) SOFT MATERIAL SEPARATOR WITH FILL-LEVEL-DEPENDENT ADJUSTMENT OF SPEED, AND METHOD FOR OPERATING SUCH A SOFT MATERIAL SEPARATOR

(71) Applicant: MODERNPACK HOPPE GMBH, Overath (DE)

(72) Inventor: Günther Hoppe, Overath (DE)

(73) Assignee: MODERNPACK HOPPE GMBH, Overath (DE)

( * ) Notice: Subject to any disclaimer, the term of this patent is extended or adjusted under 35 U.S.C. 154(b) by 918 days.

(21) Appl. No.: 16/965,637

(22) PCT Filed: Oct. 30, 2018

(86) PCT No.: PCT/EP2018/079679
§ 371 (c)(1),
(2) Date: Jul. 29, 2020

(87) PCT Pub. No.: WO2019/149397
PCT Pub. Date: Aug. 8, 2019

(65) Prior Publication Data
US 2021/0037837 A1    Feb. 11, 2021

(30) Foreign Application Priority Data
Jan. 30, 2018 (DE) .......................... 102018101985.8

(51) Int. Cl.
*A22C 17/04* (2006.01)
*B30B 9/24* (2006.01)

(52) U.S. Cl.
CPC .............. *A22C 17/04* (2013.01); *B30B 9/241* (2013.01)

(58) Field of Classification Search
CPC .................................. A22C 17/04; B30B 9/241
(Continued)

(56) References Cited

U.S. PATENT DOCUMENTS 2,365,658 A * 12/1944 Schumacher ........... B30B 9/241
100/153
3,320,680 A * 5/1967 Missbach ................ B29C 59/06
251/129.22
(Continued)

FOREIGN PATENT DOCUMENTS

DE        2548980 B1    11/1976
DE        4223346 C2    1/1994
(Continued)

OTHER PUBLICATIONS

Lunz, Jan, Lehrstuhl fur Automatisierungstechnik, Regelsungstechnik 1, systemtheoreticshe Grundlagen Analyse und Entwurf einschliefiger Regelungen, Springer-Verlag, Berlin (2001).
(Continued)

*Primary Examiner* — Richard T Price, Jr.
(74) *Attorney, Agent, or Firm* — Hudak, Shunk & Farine Co. LPA (57) ABSTRACT

A soft material separator (1) has a perforated drum (2) A pressing band (3) is guided along a circumferential section (19) of the perforated drum (2) and can be operated together with the perforated drum (2). A feed zone (7), from which a substance mixture (14) consisting of substance components (12, 13) of different consistencies is drawn in between the perforated drum (2) and the pressing band (3) to separate the substance components (12, 13). For optimization in terms of wear and energy consumption without any or without significant losses in effectiveness of the device, a detection system (9) is provided to quantitatively determine the fill level of the feed zone (7), and a control apparatus (10) which is connected to the detection system (9) is provided to adjust the speed of the perforated drum (2) and of the pressing band (3) depending on the fill level.

19 Claims, 2 Drawing Sheets

(58) Field of Classification Search
USPC .......................................................... 452/141
See application file for complete search history.

(56) References Cited

U.S. PATENT DOCUMENTS

| | | | | |
|---|---|---|---|---|
| 3,813,082 A * | 5/1974 | Manser | .................... | A21C 1/06 |
| | | | | 366/349 |
| 4,156,384 A * | 5/1979 | Hinds, Jr. | ............... | B30B 9/246 |
| | | | | 426/582 |
| 9,089,876 B2 * | 7/2015 | Hoppe | .................... | B30B 15/34 |

FOREIGN PATENT DOCUMENTS

| | | |
|---|---|---|
| DE | 19637640 C2 | 3/1998 |
| DE | 19859930 A1 | 6/2000 |
| DE | 20319283 U1 | 4/2004 |
| DE | 102009031943 A1 | 1/2011 |
| EP | 0375876 B1 | 7/1994 |

OTHER PUBLICATIONS

Baader Food Processing Machinery No. 605E, Entsehnungsmachine Betriebsanleitung (Jun. 27, 2019).

* cited by examiner

SOFT MATERIAL SEPARATOR WITH FILL-LEVEL-DEPENDENT ADJUSTMENT OF SPEED, AND METHOD FOR OPERATING SUCH A SOFT MATERIAL SEPARATOR

CROSS-REFERENCE TO RELATED APPLICATIONS

This application is a national stage application (under 35 USC § 371) of PCT/EP2018/079679, filed Oct. 30, 2018, which claims priority to German patent application DE 10 2018 101 985.8, filed Jan. 30, 2018, the contents of each of which are incorporated by reference herein.

BACKGROUND OF THE INVENTION

Technical Field and State of the Art

The invention relates to a soft material separator according to the generic part of claim 1 as well as to a method for operating such a soft material separator.

A soft material separator is a device for breaking up and separating a material mixture made up of constituents having different consistencies. Soft material separators are employed, for example, to process products having varying solid, flowable or soft textures, especially for processing food products such as, for instance, meat products. In this context, soft material separators can grind and de-sinew different types of meat in order to produce so-called mechanically separated meat. Soft material separators are also suitable for the production of skinless and boneless fish farce, for the production of fruit and vegetable juice or fruit and vegetable purée, and they are also well-suited for the production of purée made from root and tuber vegetables such as, for example, potatoes. Some of the fields of application of soft material separators even extend all the way to the recycling industry, for instance, in order to extract the contents of discarded packaging.

A soft material separator typically has a perforated drum configured so as to be rotationally symmetrical and to have holes on its circumference, and this drum can be turned around its rotational axis. A continuous squeezing belt is positioned on a section that runs tangentially to the circumferential wall of the perforated drum. The perforated drum and the squeezing belt can be operated by means of a drive. The movements of the perforated drum and of the squeezing belt are normally coordinated with each other in such a way as to bring about an equidirectional, preferably synchronous, circumferential movement in the area of their tangential overlap.

In a feed zone that is upstream from the overlap and that is laterally delimited, the perforated drum and the squeezing belt run towards each other in the feeding direction, so that, while the perforated drum and the squeezing belt are running, a material mixture placed there is drawn in between the perforated drum and the squeezing belt and is then pressed against the perforated circumferential wall of the perforated drum. In this process, at least one of the material constituents passes through the perforation in the circumferential wall and enters the interior of the perforated drum, thereby being separated from the other material constituents. The holes in the perforated drum are configured as a function of the application in such a way that, under the pressure exerted by the squeezing belt, the circumferential wall of the perforated drum is permeable to at least one material constituent having a certain consistency. The perforated drum is often also referred to as a hollow drum, the squeezing belt is referred to as a pressing belt, and consequently, the soft material separator is referred to as a "separator of the hollow drum-pressing belt type" or else as a "pressing belt separating device".

Normally, under a prescribed pressure, in other words, under pre-tensioning, the squeezing belt is in direct contact with the circumferential wall of the perforated drum in order to ensure a sufficiently high pressing force while the material mixture is being passed through between the circumferential wall and the squeezing belt. The contact pressure is transferred to the squeezing belt by means of a pressure roller that is pre-tensioned relative to the squeezing belt. In some application cases, for example, in the production of potato purée, the squeezing belt can be positioned relative to the perforated drum in such a way that a minimal gap is left between the circumferential wall of the perforated drum and the squeezing belt, so that the squeezing belt only exerts an indirect pressure that is directed against the perforated drum once the gap has been at least partially filled up by the material mixture that is passing through.

The squeezing belts themselves are at least partially made of a resilient material or else are coated with a resilient material on the side facing the perforated drum. This serves to cause the material constituents that are not entering the perforated drum to temporarily sink into the elastic squeezing belt that is softer in comparison to the perforated drum. For example, during the production of mechanically separated meat, the bones, in other words, constituents whose consistency is not so soft, are pressed into the elastic squeezing belt, thereby preventing too much comminution of the bones due to an excessive pressure load, which would especially result in bone splinters and cartilage fragments in the meat.

The softer and/or more flowable substances and/or less solid substances are processed and separated from the other material constituents in the processing zone of the soft material separator formed by the overlap of the perforated drum and the squeezing belt. The material constituents that remain on the outside of the circumferential wall of the perforated drum are removed from the perforated drum or from the squeezing belt by a scraper situated in a discharge zone.

The mechanical structure of prior-art soft material separators already displays good wearing and efficiency properties during continuous operation and under high loads. However, dry running, that is to say, operation without a material mixture, is something that needs to be avoided in any case since this causes very high wear and tear, especially of the squeezing belt but also of other components. Unnecessarily high squeezing belt speeds also have a detrimental effect on the service life of the machine since this causes greater wear and tear of the components. In this context, high temperatures sometimes arise due to the stresses that occur between the perforated drum and the squeezing belt. Under certain circumstances, it is necessary to cool the pressure rollers or to cool down the material mixture before it passes through the soft material separator to such an extent that, even though the material mixture picks up heat from the soft material separator, it nevertheless remains below temperature limits that may have been prescribed.

For this reason, the state of the art discloses measures which are aimed at preventing the soft material separator from running dry and which are aimed at adjusting the processing speed to the product feed or the product feed to the processing speed.

German patent application DE 196 37 640 A1 describes a monitoring system that uses a temperature sensor to detect whether a product to be processed has been placed into the feed zone. The temperature sensor detects the heat radiation of the squeezing belt in the feed zone and this detector is configured to detect any interruption of the heat radiation along a line of sight. An interruption of the heat radiation in the line of sight of the sensor always occurs when a piece of the product to be processed that is dropping into the feed zone crosses the line of sight of the temperature sensor. This makes it possible to monitor whether a product is being fed into the feed zone at that moment. If the heat radiation along the line of sight of the temperature sensor is constantly interrupted, then the system assumes that the product to be processed has backed up in the feed zone and is thus accumulating there. In order to prevent the feed zone from overfilling, the drive of a charging device situated upstream from the feed zone is automatically stopped. In turn, if there is a constant temperature signal of the squeezing belt, the system assumes that no product is being fed in at that moment. The drive of the squeezing belt and of the perforated drum is then automatically switched off in order to prevent dry running.

A similar approach is taught in European patent specification EP 0 375 876 B1, in which an optical or acoustic tactile sensor is meant to detect a product that is crossing or blocking a line of sight of the sensor, so that the squeezing belt and the perforated drum or a feeding device can be stopped or activated as needed. European patent specification EP 0 375 876 B1 also teaches automatically adjusting the processing speed to the product feed or the product feed to the processing speed. This approach for optimizing the capacity utilization, however, has proven to be unreliable and not expedient. For this reason, it was discarded decades ago and has not been tried again. Therefore, the processing speed of the soft material separators employed nowadays has to be manually set by trained and experienced machine operators and adjusted whenever needed. In actual practice, soft material separators are generally operated at the maximum processing speed. Any necessary adjustments to a fluctuating material feed are made by automatically switching off the product feed or the soft material separator.

Soft material separators that can switch on and off automatically as protection against running dry or overfilling, however, entail the drawback that the frequent switching procedures cause a great deal of wear and tear, are energy-intensive or technically not practicable, and consequently should be avoided to the greatest extent possible.

As a rule, soft material separators are designed for, and manually set to, the maximally anticipated product volume per unit of time, in other words, to a high processing speed, and this leads to relatively frequent triggering of the automatic switch-off device to protect against dry running and thus to protect the components that are prone to wear and tear. In comparison to continuous operation, each instance of switching on and off translates into greater wear and tear, into greater energy consumption and thus into greater heat input into the energy-intensively cooled environment of the food product processing.

Before the backdrop of the disadvantages described above, the invention is based on the objective of putting forward an improved soft material separator that, in terms of its wear and tear and energy consumption, entails only negligible losses or none at all in the processing yield.

SUMMARY OF THE INVENTION

According to an embodiment of the invention, a soft material separator is being put forward having a perforated drum with holes on its circumference as well as having a squeezing belt that runs along a circumferential section of the perforated drum. The squeezing belt can be operated together with the perforated drum. The soft material separator has a feed zone from which a material mixture made up of constituents having different consistencies is drawn in between the perforated drum and the squeezing belt in order to break up and separate the material constituents contained therein. The invention is characterized by a detection system that quantitatively determines the filling level of the feed zone and by a control unit that is connected to the detection system and that adjusts the speed of the perforated drum and of the squeezing belt as a function of the filling level.

The term quantitative determination of the filling level refers to the process of ascertaining a measured value that depends on how much material mixture is present in the feed zone. As a function of this measured value, the control unit sets the speed of the perforated drum and of the squeezing belt by actuating their drive. The automatic adjustment of the processing speed of the soft material separator to the quantity of material mixture placed into the feed zone makes it possible for the perforated drum and the squeezing belt to always be operated at the lowest possible speed while maintaining an essentially constant throughput of the product. The service life of the components that are particularly prone to wear and tear such as the perforated drum and the squeezing belt can be noticeably prolonged in this manner since the number of stopping and re-starting procedures is reduced. This can also bring about a reduction in the consumption of the drive energy. The invention can even make it possible to dispense with a dedicated feeding device that is provided on the soft material separator and that serves as a buffer for the material mixture, thus simplifying the structure of the soft material separator. It is even possible to install the soft material separator—which up until now has been a free-standing device—as an integral member in a processing line, since the processing speed of the soft material separator—which so far has always been consistently set for the maximum anticipated quantity of material—can now automatically set itself to the speed at which the material mixture is being fed in.

In a preferred manner, the filling level is determined contactlessly. This embodiment has the advantage that no moving parts are needed in order to determine the filling level. This simplifies the hygienic cleaning of the soft material separator and prevents mechanical malfunctioning of the detection system. Preferably, the determination is carried out optically or acoustically, an approach that has proven to be reliable, particularly in the realm of food product processing. The determination can especially be carried out optically employing laser scanning or camera detection, or else acoustically by means of ultrasound measurement.

In a refinement of this embodiment, it can be provided for the detection system to have at least one sensor, preferably an optical, acoustic and/or imaging sensor, whose detection area extends in at least two, preferably three, spatial directions and which is directed at the feed zone, at least in certain places.

The special advantage of such a sensor lies in the fact that, at least to a certain extent, it is possible to "have an overview" of the feed zone, which has a complex shape due to the convergence of the perforated drum and the squeezing belt. After all, the material mixture placed into the feed zone often consists of irregularly shaped individual pieces that do not become automatically and uniformly distributed in the feed zone. Sometimes, the material mixture behaves like bulk material or separate pieces which, due to the different consistencies of the individual material constituents, tend to agglomerate or stick together. This can lead to an irregular distribution within the feed zone, something which can hardly or not at all be detected by sensors that function one-dimensionally. The detection area of a sensor that detects two-dimensionally or three-dimensionally, for example, can be directed at the entire width of the squeezing belt so as to monitor the capacity utilization of the squeezing belt width. The speed of the perforated drum and of the squeezing belt can then preferably be made dependent additionally or exclusively on whether the squeezing belt width is covered with a material mixture or not.

The invention can also be refined to the effect that the detection system ascertains the filling level by means of at least one distance measurement in which the distance between at least one sensor of the detection system and the material mixture present in a detection area of the detection system is determined. This type of quantitative determination of the filling level has proven to be particularly well-suited. The distance can be measured, for instance, by means of one or more ultrasound sensors.

According to another variant of the invention, the detection system can be configured to generate a measured signal that is dependent on the filling level and then to calculate a filling level signal that is derived from the measured signal. In this context, the filling level signal corresponds essentially to a filling level, filling degree or filling quantity. In this case, the control unit is configured to adjust the speed of the perforated drum and of the squeezing belt as a function of the filling level in response to the filling level signal.

In this manner, the adjustment of the working speed of the perforated drum and of the squeezing belt can be rendered dependent on different secondary values derived from the sensor signal. The filling level is the filling height of the material mixture as measured from a reference point at the base of the feed zone, for example, from a reference point on the squeezing belt. The filling degree is the percentage value that indicates to what extent the feed zone is filled with the material mixture, relative to the total volume of the feed zone. This derived measured value can be especially advantageous if the feed zone is configured as a hopper that is open towards the top, in which the filling height does not correlate linearly or proportionally with the filling degree.

For purposes of optimizing the operation of the soft material separator, it can also be advantageous to carry out the filling level-dependent adjustment relative to the quantity of material mixture that is actually present in the feed zone. The capacity utilization of the squeezing belt width can also be optimized by measuring and regulating, for example, the filling height of the material mixture present on the squeezing belt. The material mixture that accumulates as bulk material or separate pieces on the squeezing belt or in the feed zone becomes distributed while forming a natural angle of repose in the feed zone. Setting a natural angle of repose that is dependent on the properties of the material mixture can improve the capacity utilization of the entire squeezing belt width and thus the uniform processing yield of the soft material separator.

According to an advantageous embodiment, fixed speed values associated with certain filling levels can be stored in the control unit. The control unit, which is simply structured in this case, can then, on the basis of the ascertained filling level, actuate the drive of the perforated drum and of the squeezing belt to run at the speed that is prescribed for this. Such a set-up of the control loop allows the use of simple drive technology, nevertheless implementing a quasi-proportional regulation.

Preferably, the control unit has a steady controlling element that regulates the speed as a function of the filling level, for example, proportionally to the filling level of the feed zone. This entails the advantage that a continuous regulation allows the speed to be raised and lowered uniformly, so that the change of the speed is changed in a manner that is particularly gentle on the material.

In a refinement of this idea, the control unit can be additionally configured with at least one integrating and/or differentiating controlling element. For one thing, the use of a differentiating controlling element improves the response behavior. The soft material separator can then respond faster to a change in the feed of material mixture. The use of an integrating controlling element, which can generate a time slope of the control signal that is dependent on the control deviation, makes it possible to improve the precision of the regulation of the filling level as well as the response behavior of the drive so as to be gentle on the material.

According to an advantageous embodiment, the perforated drum and the squeezing belt can be driven by means of a drive and the control unit can be integrated into the drive. This has the advantage that the detection system can be connected directly to the drive, thus simplifying the structure of the soft material separator. Here, the control unit can be integrated, for example, into a frequency converter of the drive, whereby the frequency converter itself can be part of the electric motor, or else it can configured as a component connected to the electric motor of the drive.

In a preferred manner, the control unit can be configured to adjust the speed of the perforated drum and of the squeezing belt to below a maximum value and/or above a minimum value. Specifying a maximum value can be practical in order to allow an adjustment to the speed of the processes that take place downstream from the soft material separator. Specifying a minimum value can serve to optimize the feeding behavior of the material mixture in the feed zone since, in the case of material mixtures having certain compositions, the feed should not fall below a minimum speed in order to attain a reliable material feed into the processing zone.

In this process, input means for adjusting the maximum and/or minimum values of the speed of the perforated drum and of the squeezing belt can preferably be provided on the soft material separator, thus allowing the user to adjust the speed during operation.

In addition to adjusting the speed of the perforated drum and of the squeezing belt to the filling level of the feed zone, the control unit can be configured to bring the perforated drum and the squeezing belt to a complete standstill if the filling level falls below a prescribed minimum value. This additional safety measure can reliably prevent dry running if there is a prolonged interruption in the feed of the material mixture or if the quantitative determination of the filling level is faulty.

In a refinement of this variant, the detection system can have at least one sensor to quantitatively determine the filling level of the feed zone and at least one sensor to detect whether the filling level has fallen below a minimum and/or whether the filling level has exceeded a maximum. This additional safety measure can prevent dry running, for example, if the quantitative determination of the filling level were to become faulty. It can also prevent overfilling of the feed zone and thus blocking of the soft material separator if a maximum filling level is exceeded. In order to prevent dry running, the perforated drum and the squeezing belt are stopped in response to the sensor signal. In order to prevent overfilling, a feeding device can be stopped in response to the sensor signal.

As an alternative or in addition, the invention can also be augmented in that the control unit is configured to emit a control signal if overfilling of the feed zone is detected, in response to which a feeding device situated upstream from the soft material separator can be slowed down or stopped. By means of such a safety measure, an overfilling and thus a prolonged downtime of the soft material separator caused by a malfunction can be effectively prevented, or at least made less likely.

The method according to the invention for operating a soft material separator is characterized in that the speed of the perforated drum and of the squeezing belt is adjusted to the filling level of the feed zone, in particular, it is regulated as a function of the filling level of the feed zone. In this manner, the soft material separator is always operated at an optimal speed, in other words, at an optimal operating point.

Other embodiments of the method according to the invention can be analogously gleaned from the advantageous embodiments of the device according to the invention.

DESCRIPTION OF THE DRAWINGS

Additional objectives, advantages, features and application possibilities of the present invention ensue from the description below of an embodiment making reference to the drawing. In this context, all of the described and/or depicted features, either on their own or in any meaningful combination, constitute the subject matter of the present invention, also irrespective of their compilation in the claims or the claims to which they refer back.

In this context, the following is shown.

DETAILED DESCRIPTION

For the sake of clarity, identical components or those having the same effect are provided with the same reference numerals in the following figures, making reference to an embodiment.

Figure 1:
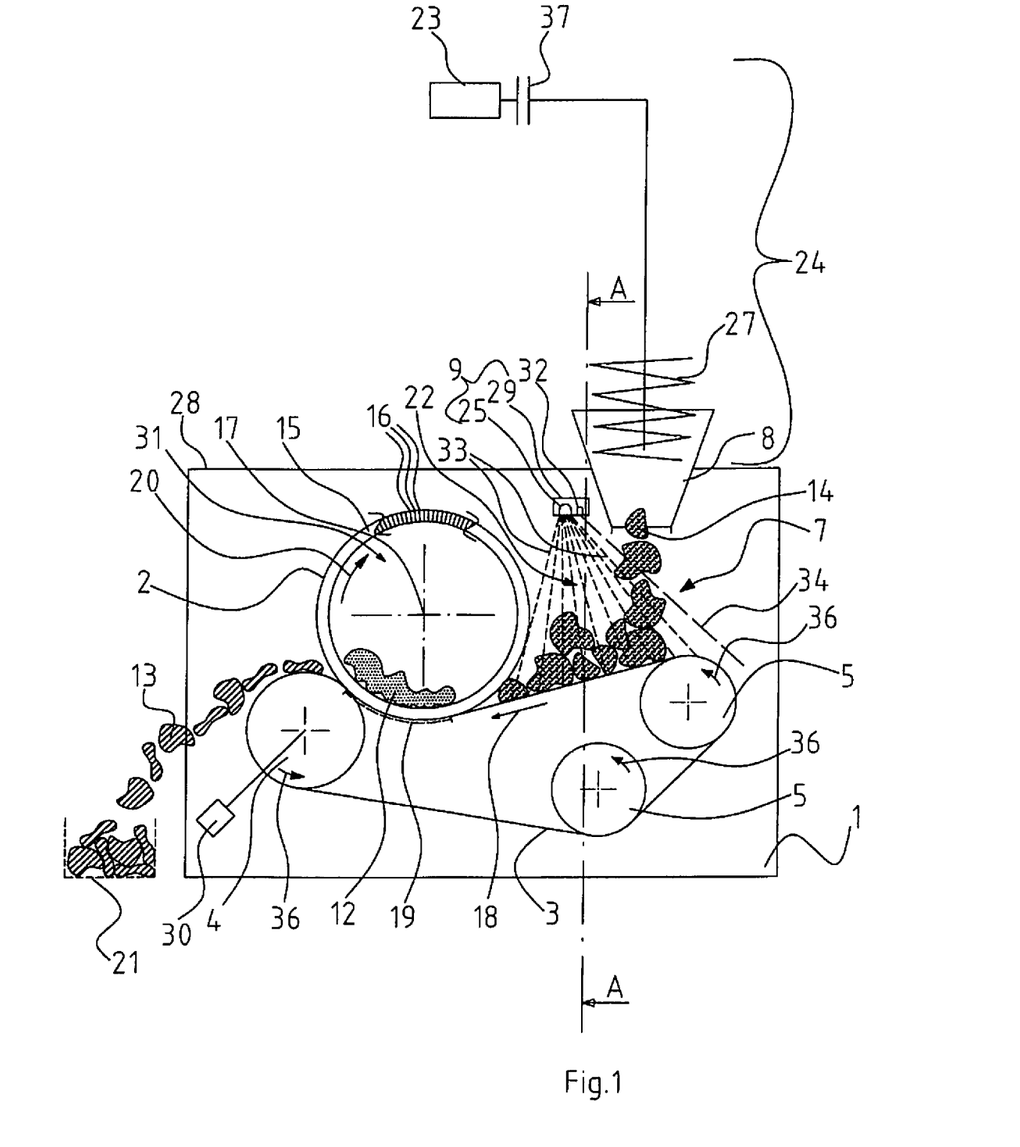
FIG. 1 a schematic side view of a soft material separator according to the invention, and FIG. 2 a schematic sectional view along sectional line A-A as shown in FIG. 1.
Figure 2:
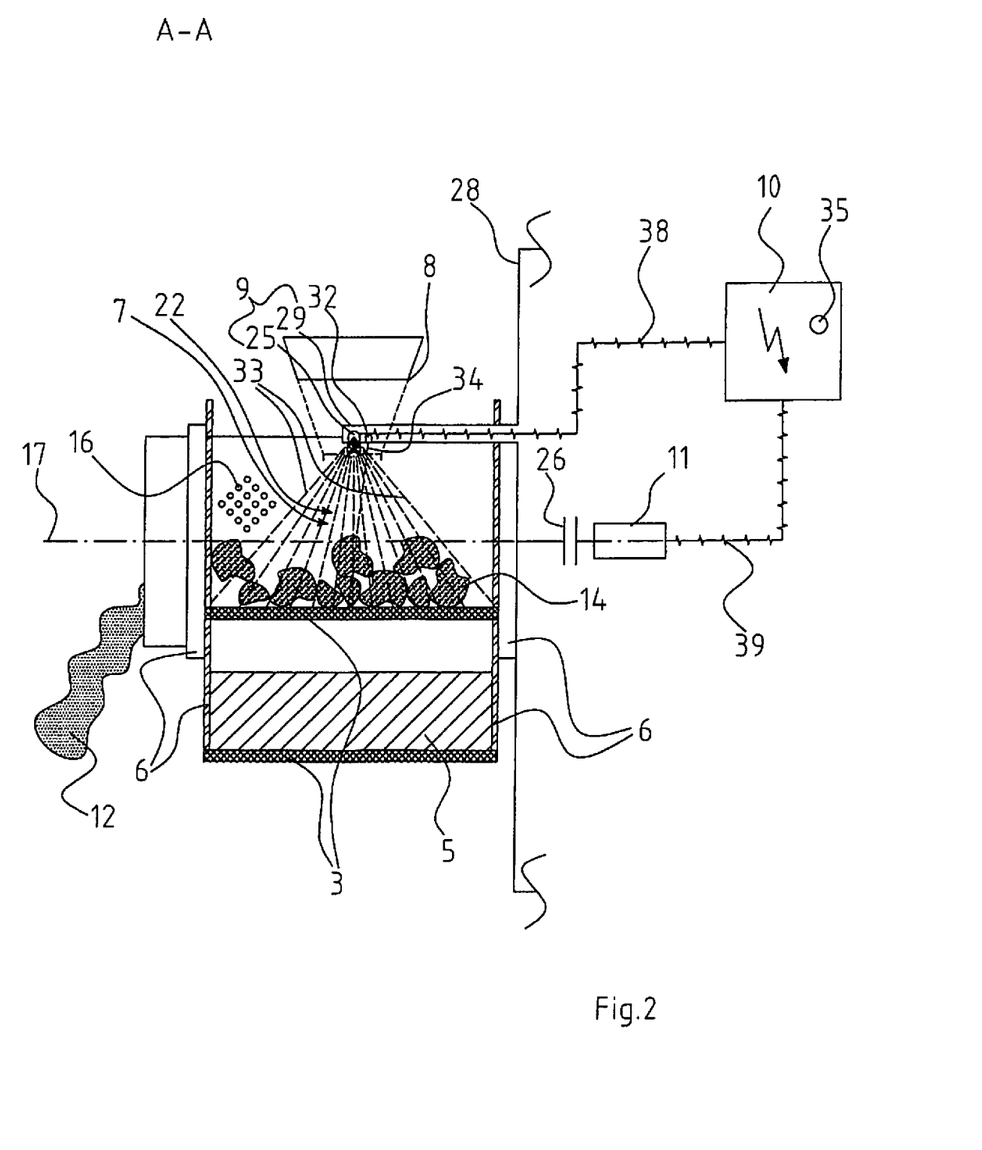

FIG. 1 and FIG. 2 show the device according to the invention in the form of a soft material separator 1 for separating a material mixture 14 made up of material constituents 12, 13 having different consistencies, for instance, meat, which is to be separated from bone, cartilage or sinew. The soft material separator has a rotationally symmetrical perforated drum 2. In the present embodiment, the perforated drum 2 is configured so as to be cylindrical, and its circumferential wall 15 is perforated by a plurality of holes 16. The perforated drum 2 is held inside machine cladding 28 and is mounted in it so as to be rotatable around its axis of symmetry 17. The perforated drum 2 can be rotated around the axis of symmetry 17 by means of a drive 11. The drive 11 is operatively connected to the perforated drum 2 by means of a coupling mechanism 26.

The device also has a continuous squeezing belt 3 that consists at least partially of an elastic material. The term "elastic material" refers to a material that is more resilient than the material of the perforated drum 2, which is made, for example, of steel. The elastic material can be, for instance, natural rubber, polyurethane or artificial rubber, in other words, synthetic rubber such as, for example, EPDM. As an alternative, a firm squeezing belt 3 made, for instance, of steel, can be provided with an elastic layer (not shown here) made of one of the above-mentioned elastic materials. The squeezing belt 3 can be manufactured without a seam as a continuous belt, or else it can be configured as a belt section whose ends have been joined together.

The squeezing belt 3 runs over a roller guide which, in this case, has a pressure roller 4 that is cooled in certain embodiment variants, and also a pair of rollers 5. The roller guide is configured in such a way that part of the squeezing belt 3 runs tangentially along a section of the circumferential wall 15 of the perforated drum 2. This area is referred to below as the processing zone or as the overlap 19. In the area of the overlap 19, the squeezing belt 3 can be configured so as to be in contact with the circumferential wall 15 or at a distance from it. In any case, the pressure roller 4 exerts a pressure or elastic pre-tension onto the squeezing belt 3 in such a way that the squeezing belt 3 rests directly against the perforated drum 2 under constant pre-tensioning, or else a pre-tension is exerted onto the material mixture and thus indirectly onto the perforated drum 2 only once a material mixture 14 is passing through the processing area. The pre-tension against the perforated drum 2 can be built up and adjusted by means of a hydraulic unit 30 that is connected to the mount of the pressure roller 4.

When it comes to driving the squeezing belt 3 by means of the coupling mechanism 26, for example, a chain drive, the rollers of the pair of rollers 5 and the pressure roller 4 are operatively connected to the drive 11 and, at the same time, synchronized with the perforated drum 2. The squeezing belt 3 is wound onto the roller guide under pre-tensioning, so that the drive movements 36 that are transferred to the pair of rollers 5 and to the pressure roller 4 by means of the coupling mechanism 26 can be transferred essentially slip-free to the squeezing belt 3. The perforated drum 2 and the squeezing belt 3 are synchronized in such a way that the area of the overlap 19 is traversed essentially without a different relative speed between the squeezing belt 3 and the perforated drum 2 in the circumferential direction. In the area of the overlap 19, the perforated drum 2 and the squeezing belt 3 execute a joint circumferential movement 20 around the axis of symmetry 17 of the perforated drum 2.

At the sides of the perforated drum 2 as well as of the squeezing belt 3, there are limiters 6 that guide the squeezing belt 3 along the side, in other words, they laterally delimit the area of the overlap 19 as well as a feed zone 7 located upstream from the processing zone. The feed zone 7 is formed by the squeezing belt 3 that converges tangentially with the perforated drum 2 in a feeding direction 18 as well as by the lateral limiters 6.

A hopper 8 that is physically arranged above the feed zone 7 feeds the material mixture 14 to be processed to the feed zone 7. A feeding device 24 is situated upstream from the hopper 8. The feeding device 24 can be part of the soft material separator 1. When the soft material separator 1 is employed in a processing line, the feeding device 24 is a separate machine which is located upstream from the soft material separator 1 and which is physically arranged next to or above the soft material separator 1 and from which the material mixture 14 that is to be fed in drops into the feed zone 7. The feeding device 24 can be configured here, for instance, as a silo dispenser, feed belt or manual feed.

As shown here, the feeding device 24 can also have a transport mechanism 27, for example, a transport auger by means of which material mixture 14 is fed from an upstream container into the hopper 8 and thus into the feed zone 7. The feeding device 24 has a drive 23 for operating the transport mechanism 27. The drive 23 and the transport mechanism 27 are operatively connected to each other by means of a coupling mechanism 37.

A sensor 25 of a detection system 9 is arranged in a housing 29 on the machine cladding 28 and, according to the invention, this sensor 25 detects the quantitative filling state or the filling volume, the filling level or the filling degree in the feed zone 7.

An optional additional sensor 32 of the detection system 9 can serve to provide a purely qualitative monitoring of the feed zone 7 as to whether a material mixture 14 is being fed in. The sensor 32 can be, for example, a reflective photoelectric sensor that can detect the presence of objects along its line of sight 34. The sensor 25 and the optionally present additional sensor 32 of the detection system 9 have a communication connection with a control unit 10. A constant presence of objects along the line of sight 34 of the sensor 32 indicates that the feed zone 7 is overfilled, in other words, that a maximum filling level has been exceeded. A constant absence of objects along the line of sight 34 of the sensor 32 indicates that the feed zone 7 is running empty, and therefore that the filling level has fallen below a minimum value.

The sensor 25 uses the detection system 9 to detect the actual value of the filling level of the material mixture 14 in the feed zone 7, preferably continuously, and the sensor 25 then transmits to the control unit 10 a corresponding measured value or a filling-level value derived from the measured value. For example, the measurement is made by means of an ultrasound measurement carried out by the sensor 25 in order to ascertain the shortest distance between the material mixture 14 and the sensor 25 within its detection area 22.

As can be seen from the fan-shaped lines 33 shown in FIGS. 1 and 2, the detection area 22 of the sensor 25 extends along the length of the fan-shaped line 33 as well as approximately in the shape of a cone or lobe in the direction of the squeezing belt 3, in other words, in three spatial directions. In particular, the detection area 22 of the sensor 25 inside the feed zone can be directed at an area of the squeezing belt 3 directly before the beginning of the overlap 19, for instance, at an area amounting to about 0 cm to 40 cm starting at the beginning of the overlap 19 as seen opposite from the feeding direction 18.

The control unit 10 can be connected to a programmable logic controller or else it can be formed by such. The control unit 10 compares the measured actual value of the filling level to a prescribed target value and then regulates the speed of the drive 11—to which the control unit 10 is connected via a control line 39—as a function of the filling level and/or as a function of the control deviation between the target value and the actual value.

If the sensor 25, and optionally the sensor 32, detect(s) that the maximum value of the filling level has been exceeded, in other words, that overfilling is imminent or already occurring, then the control unit 10 can emit a special signal by means of which the drive 23 of the feeding device 24 or the upstream feed can be stopped by way of an exception in order to prevent overfilling. For this purpose, the control unit 10 can be additionally connected to the drive 23 via a control line not shown here. If the sensor 25 and optionally the sensor 32 have detected that the filling level has fallen below a minimum value, then the control unit 10 can stop the drive 11 of the soft material separator 1 in order to prevent the perforated drum 2 and the squeezing belt 3 from running dry.

The processing method carried out with the soft material separator 1 provides for processing a material mixture 14 made up of material constituents 12, 13 having different consistencies in such a way that the material constituents 12 having a first consistency are separated from the material constituents 13 having a second consistency. For example, residual meat can be separated from bone, cartilage or sinew.

The consistency of the material mixture 14 can refer to the firmness of the tissue that is to be broken up, to its hardness, flowability or the like. For example, during the de-sinewing process, the firmness of the sinew contained in the meat is greater than the firmness of the meat that surrounds the sinew. The production of mechanically separated meat from poultry carcasses or the production of fish farce by separating the skin and bone constituents can involve different levels of hardness or softness of the individual material constituents 12, 13. In the production of fruit juice or vegetable purée, the consistency of the individual material constituents 12, 13 can be described in terms of different levels of flowability of the fruit constituents.

The material mixture 14 with both material constituents 12, 13 having different consistencies is shown in FIGS. 1 and 2 in such a way that the first material constituent 12 having the first consistency is depicted by dotted cross-hatching while the second material constituent 13 having the second consistency is depicted by diagonal cross-hatching in the form of lines.

As can be seen in FIGS. 1 and 2, the material mixture 14 that is initially kept ready in the hopper 8 contains the material constituents 12 having the first consistency as well as the material constituents 13 having the second consistency. The material mixture 14 drops out of the hopper 8 into the feed zone 7 and from there onto the squeezing belt 3.

The material mixture 14 accumulates in the feed zone 7 and is drawn in by the feeding movement 18 that occurs on the perforated drum 2 and the squeezing belt 3 into the area of the overlap 19, that is to say, into the processing zone, where the squeezing belt 3 exerts a contact pressure onto the material mixture 14 in the direction of the circumferential wall 15 of the perforated drum 2.

Under the effect of the pressing force, the material constituents 12 of the material mixture 14 are separated from the material constituents 13 and then enter the interior 31 of the perforated drum 2 through openings 16 along its circumference. The material constituents 13 having the second consistency, in contrast, remain between the circumferential wall 15 and the squeezing belt 3, a process in which at least some of these constituents sink into the elastic areas of the squeezing belt 3 and are thus protected from an excessive load exerted by the pressing force. This especially serves to prevent undesired substances from these material constituents 13 from being released and prevents them from being transferred into the material constituents 12 in the interior 31 of the perforated drum 2. For example, when chicken carcasses are being processed, it can be important for the chicken bones that are present between the squeezing belt 3 and the perforated drum 2 not to be comminuted too strongly, so that the meat constituent that is entering the interior 31 of the perforated drum 2 only absorbs a limited amount of calcium stemming from the comminuted chicken bones.

After passing through the processing zone, the material constituents 13 of the material mixture 14 that have not been separated are collected in a discharge receptacle 21. The discharge receptacle 21 can also be a container that is regularly replaced. At the beginning of the process, the perforated drum 2 is run together with the squeezing belt 3 at a prescribed starting speed at which the material mixture 14 present in the feed zone 7 is drawn in and processed. The starting speed can be a minimum speed that can be adjusted using an input means 35, said minimum speed being one that is required to reliably draw the material mixture 14 from the feed zone 7 into the processing zone, in other words, into the overlap 19. Setting a minimum speed also ensures that, if the feed of material mixture 14 into the feed zone 7 stops, the feed zone 7 is emptied out before the perforated drum 2 and the squeezing belt 3 have been automatically stopped as protection again their running dry.

The sensor 25 of the detection system 9 that is physically situated above the feed zone 7 determines the filling level of the feed zone 7. As soon as the filling level rises or falls, the processing speed of the perforated drum 2 and of the squeezing belt 3 is raised or lowered, with the aim of maintaining a uniform filling level in the feed zone 7. This brings about an automatic adjustment of the processing speed to the quantity of material mixture 14 present in the feed zone 7. Maintaining a prescribed filling level can ensure, for instance, that the material mixture 14 that is to be drawn into the processing zone can be reliably drawn in if there is always sufficient material above it weighing down on the squeezing belt 3. Different filling heights or levels can be prescribed, for example, for different types of material mixtures 14.

With an eye towards maintaining a prescribed filling level, the feed zone 7 also automatically functions as a material buffer that can temporarily compensate for interruptions in the feed of the material mixture 14 into the feed zone 7 and can also prevent a standstill of the drive 11.

The algorithm in the control unit 10 from which the speed adjustment is derived can be based, for instance, on the fact that each filling level value is always associated with a certain speed value. This can also be achieved with very simple control units. The associated values can even compensate for non-linearities that are present in the device, for example, an irregular geometric shape of the feed zone 7, in order to obtain satisfactory regulation results.

As an alternative, the control unit 10 can also be configured in such a way that a steady control is carried out involving continuous determination of a control deviation stemming from the measured actual value of the filling level and the prescribed target value, and the speed of the drive is always readjusted in order to maintain the prescribed filling level. On the one hand, this can serve to allow a quick response to greatly fluctuating filling levels or else to set the drive regulation so slow that high-wear acceleration and braking procedures are prevented. Also in the case of a steady control of the speed of the perforated drum 2 and of the squeezing belt 3 as a function of the filling level, a minimum speed can be prescribed at which the perforated drum 2 and the squeezing belt 3 are operated in order to reliably empty out the feed zone 7 before initiating the switch-off procedure that serves to prevent dry running.

The steady control can be configured, for instance, as a simple proportional-action controller or else as a controller with an additional integrating controlling element and/or differentiating controlling element, in other words, as a so-called PID (proportional-integral-derivative) controller.

The detection system 9 can be configured to carry out an ultrasound measurement which ascertains the highest point of the material mixture 14 that has accumulated in the feed zone 7. As an alternative, however, it is also possible to use an optical sensor, for example, a laser sensor or a camera, which is directed at the feed zone 7 so that, on the basis of the detection of individual sub-units of the material mixture, a conclusion can be reached about the actual filling level. Measurement employing radar is likewise conceivable.

The sensor 25 can also be configured in such a way that it allows a two-dimensional or three-dimensional imaging of the feed zone 7, on which basis the volume of material mixture contained in the feed zone 7 can then be calculated.

Therefore, the system can always be operated at the lowest possible speed, so that wear and tear of the squeezing belt 3 as well as of other components is minimized. By the same token, the consumption of energy by the system is reduced while the processing yield remains constant.

LIST OF REFERENCE NUMERALS 1 soft material separator
2 perforated drum
3 squeezing belt
4 pressure roller
5 pair of rollers
6 lateral limiters
7 feed zone
8 hopper
9 detection system
10 control unit
11 drive
12 material constituent having a first consistency
13 material constituent having a second consistency
14 material mixture
15 circumferential wall
16 openings
17 axis of symmetry
18 feeding direction
19 overlap
20 circumferential movement
21 discharge receptacle
22 detection area
23 drive
24 feeding device
25 sensor
26 coupling mechanism
27 conveying device
28 machine cladding
29 housing
30 hydraulic unit
31 interior
32 sensor
33 fan-shaped line
34 line of sight
35 input means
36 driving movement
37 coupling mechanism
38 sensor line
39 control line

The invention claimed is:
1. A soft material separator, comprising:
a perforated drum with holes on its circumference;
a squeezing belt that runs along a circumferential section of the perforated drum and adapted to be operated together with the perforated drum;
a feed zone from which a material mixture made up of constituents having different consistencies is drawn in between the perforated drum and the squeezing belt in order to break up and separate the material constituents contained therein;
a detection system that quantitatively determines the filling level of the feed zone; and a control unit that is connected to the detection system and that adjusts the speed of the perforated drum and of the squeezing belt as a function of the filling level.

2. The soft material separator according to claim 1, wherein the filling level is determined contactlessly with optical or acoustical equipment selected from the group consisting essentially of: camera(s), laser scanner(s), ultrasound apparatus, and combinations of thereof.

3. The soft material separator according to claim 1, wherein the detection system has at least one sensor, whose detection area extends in at least two spatial directions and which is directed at the feed zone or at a section of the feed zone.

4. The soft material separator according to claim 1, wherein the detection system ascertains the filling level by determining a distance between at least one sensor of the detection system and the material mixture present in a detection area of the detection system.

5. The soft material separator according to claim 1, wherein the detection system is configured to generate a measured signal that is dependent on the filling level and then to calculate a filling level signal that is derived from the measured signal, wherein the filling level signal substantially corresponds to a filling level, filling degree or filling quantity, and the control unit is configured to adjust the speed of the perforated drum and of the squeezing belt as a function of the filling level in response to the filling level signal.

6. The soft material separator according to claim 1, wherein fixed speed values associated with certain filling levels are stored in the control unit.

7. The soft material separator according to claim 1, wherein the control unit has a steady controlling element that regulates the speed as a function of the filling level, proportionally or integrally to the filling level of the feed zone.

8. The soft material separator according to claim 1, wherein the control unit is additionally configured with at least one integrating and/or differentiating controlling element.

9. The soft material separator according to claim 1, further comprising a drive to drive the perforated drum and the squeezing belt, wherein the control unit is integrated into the drive.

10. The soft material separator according to claim 1, wherein the control unit is configured to adjust the speed of the perforated drum and of the squeezing belt to below a maximum value and/or above a minimum value.

11. The soft material separator according to claim 10, further comprising input means for adjusting the maximum and/or minimum values of the speed of the perforated drum and of the squeezing belt.

12. The soft material separator according to claim 1, wherein the control unit is configured to bring the perforated drum and the squeezing belt to a standstill if the filling level falls below a prescribed minimum value.

13. The soft material separator according to claim 12, wherein the detection system has at least one sensor to quantitatively determine the filling level of the feed zone and at least one sensor to detect whether the filling level has fallen below a minimum and/or whether the filling level has exceeded a maximum.

14. The soft material separator according to claim 1, wherein the control unit is configured to emit a control signal if overfilling of the feed zone is detected, in response to which a feeding device situated upstream from the soft material separator is slowed down or stopped.

15. A method for operating a soft material separator according to claim 1, wherein speed of the perforated drum and speed of the squeezing belt are regulated as a function of the filling level of the feed zone.

16. A method for separating soft material food product constituents, comprising:
    placing soft material food product constituents into a feed zone and onto a squeezing belt;
    moving the squeezing belt adjacent to a circumferential surface of a rotatable perforated drum, causing a portion of the soft material food product constituents through perforations formed through the circumferential surface of the rotatable perforated drum;
    regulating the speed of the squeezing belt and the speed of rotation of the perforated drum as a function of a filling level of the feed zone with a detection system with contactless equipment selected from the group consisting essentially of: camera(s), laser scanner(s), ultrasound apparatus, and combinations thereof, and a control unit operatively connected to the detection system.

17. A soft material separator for processing food products, comprising:
    a perforated drum with a plurality of holes through its circumferential surface;
    a squeezing belt that contacts a circumferential section of the perforated drum and directs a material mixture made up of constituents having different consistencies from a feed zone toward the perforated drum, so that the material mixture drawn between the perforated drum and the squeezing belt breaks up and separates the material constituents;
    a detection system to determine a filling level of the feed zone with contactless equipment selected from the group consisting essentially of: camera(s), laser scanner(s), ultrasound apparatus, and combinations thereof; and
    a control unit operatively connected to the detection system that adjusts speed of rotation of the perforated drum and speed of the squeezing belt as a function of the filling level.

18. A soft material separator, comprising:
    a perforated drum with holes on its circumference;
    a squeezing belt that runs along a circumferential section of the perforated drum and adapted to be operated together with the perforated drum;
    a feed zone from which a material mixture made up of constituents having different consistencies is drawn in between the perforated drum and the squeezing belt in order to break up and separate the material constituents contained therein;
    a detection system that quantitatively determines a filling level of the feed zone comprising at least one sensor to quantitatively determine the filling level of the feed zone and at least one second sensor to detect whether the filling level has fallen below a minimum and/or whether the filling level has exceeded a maximum; and
    a control unit that is connected to the detection system and configured to bring the perforated drum and the squeezing belt to a standstill if the filling level falls below a prescribed minimum value, wherein the control unit adjusts the speed of the perforated drum and of the squeezing belt as a function of the filling level.

19. A soft material separator, comprising:
    a perforated drum with holes on its circumference;

a squeezing belt that runs along a circumferential section of the perforated drum and adapted to be operated together with the perforated drum;

a feed zone from which a material mixture made up of constituents having different consistencies is drawn in between the perforated drum and the squeezing belt in order to break up and separate the material constituents contained therein;

a detection system that quantitatively determines a filling level of the feed zone and a control unit that is connected to the detection system and that adjusts the speed of the perforated drum and of the squeezing belt as a function of the filling level, wherein the perforated drum and the squeezing belt are always operated at the lowest possible speed.

* * * * *